United States Patent
West

(10) Patent No.: US 6,880,225 B2
(45) Date of Patent: Apr. 19, 2005

(54) SYSTEM, METHOD, AND APPARATUS FOR ATTACHING A LEADER PIN ASSEMBLY TO DATA TAPE ON A TAPE CARTRIDGE

(75) Inventor: Richard A. West, Corona, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/444,146

(22) Filed: May 22, 2003

(65) Prior Publication Data
US 2004/0231128 A1 Nov. 25, 2004

(51) Int. Cl.[7] .......................... B23Q 3/00; B25B 27/00
(52) U.S. Cl. .......................... 29/468; 29/464; 29/242; 29/270; 29/271; 29/281.5; 29/426.5
(58) Field of Search .......................... 29/509, 464, 467, 29/468, 242, 270, 281.5, 243.56, 243.57, 29/243.5, 764, 758, 761; 242/332.8, 532.6, 242/348.2, 348, 332.7, 332.4; 360/132; 269/99; 72/448; 83/103; 226/92; 81/345, 364, 426.5

(56) References Cited

U.S. PATENT DOCUMENTS

| | | | |
|---|---|---|---|
| 3,523,351 A | * | 8/1970 | Filia .......................... 29/751 |
| 5,012,666 A | * | 5/1991 | Chen et al. .............. 72/409.01 |
| 5,303,875 A | | 4/1994 | Hoge et al. |
| 5,927,633 A | | 7/1999 | McAllister |
| 6,003,802 A | | 12/1999 | Eaton et al. |
| 6,388,838 B1 | * | 5/2002 | Kaneda et al. .............. 360/132 |
| 2002/0179764 A1 | * | 12/2002 | Yamamoto et al. ...... 242/348.2 |
| 2004/0004142 A1 | * | 1/2004 | Gavit et al. .............. 242/332.4 |

FOREIGN PATENT DOCUMENTS

| | | |
|---|---|---|
| GB | 2341 383 A | 3/2000 |
| JP | 2001-332063 | * 11/2001 |

OTHER PUBLICATIONS

10118895, Fuji Photo Film, Apr. 28, 1998.
10102653, Fuji Photo Film, Apr. 14, 1998.

(Continued)

Primary Examiner—Marc Jimenez
(74) Attorney, Agent, or Firm—Dale M. Crockatt; Dillon & Yudell LLP

(57) ABSTRACT

A tool for reattaching a leader pin assembly to the data tape of a data tape cartridge utilizes a base that snaps onto the cartridge body. The tool opens the door of the cartridge and the loose leader tape inside the cartridge is laid in an alignment channel. A leader pin is inserted into a set of receptacles over the tape, and a clip is inserted into a pocket within an arm on the tool. The tape is then folded and pulled down over the leader pin and held in the alignment channel with a finger of the user. The arm of the tool, which retains the clip, is then pivoted from a disengaged position to an engaged position. The clip snaps over a center section of the leader pin and the folded tape to form a leader pin assembly, thereby securing the tape in the leader pin assembly.

14 Claims, 5 Drawing Sheets

OTHER PUBLICATIONS

10073725, Fuji Photo Film, Mar. 23, 1998.
10047014, Fuji Photo Film, Feb. 27, 1998.
09353008, Fuji Photo Film, Dec. 22, 1997.
09352993, Fuji Photo Film, Dec. 22, 1997.

* cited by examiner

SYSTEM, METHOD, AND APPARATUS FOR ATTACHING A LEADER PIN ASSEMBLY TO DATA TAPE ON A TAPE CARTRIDGE

BACKGROUND OF THE INVENTION

1. Technical Field

The present invention relates in general to an improved installation tool and method and, in particular, to an improved apparatus and method of attaching or re-attaching a leader pin assembly to the data tape of a data tape cartridge.

2. Description of the Related Art

Several systems and methods exist for winding various types of tape. In computer and audio/visual systems, data storage systems are provided to read data from and/or write data to data storage media, such as magnetic tape. The data storage systems utilizing magnetic tape data storage media typically contain sophisticated data processing equipment and mechanical assemblies which usually include a drive unit for winding the tape. Current tape winding systems use one or more spindles around which tape is wound. To move tape in such systems, a drive unit turns a first spindle in a first direction, thereby winding the tape from a second spindle onto the first spindle. By using the drive unit to turn the second spindle in an opposite direction, the tape may be wound from the first spindle to the second spindle. For portability and tape storage purposes, it is often desirable to remove the tape from the system (hereinafter the "machine") which reads from and/or writes to the tape. Typically, the tape may either be housed entirely within a cassette which has at least two spindles (the tape being attached at each end to a separate spindle) or within a cartridge which has one spindle to which one end of the tape is attached.

In the latter design, the second end of the tape may be removed from the cartridge and drawn inside the machine which reads from and/or writes to the tape. Inside the machine, the second end of the tape is wound around a second spindle. When desired, the tape may be wound back inside the spindle within the cartridge and the cartridge may then be removed from the machine.

Single-spindle cartridge designs also have a significant advantage over cartridge designs employing two or more spindles. Specifically, cartridges having only one spindle are much more space efficient. For example, if the cartridge is square-shaped, tape wound within the single-spindle cartridge employs significantly more space within the cartridge than tape wound within multiple-spindle cartridges, where a great amount of cartridge space is left unused. However, since one end of tape within a single-spindle cartridge is commonly removed from the cartridge, drawn into the machine reading from or writing to the tape, and wound around a spindle within the machine, problems arise in the design of an element or assembly which permits the machine to "grab" or "pick" and manipulate the tape end. A number of designs are well-known in the industry, but each brings with it one or more deficiencies. Each design performs the same basic function (i.e., provides an element or assembly to which a machine may attach in order to grab or "pick" the tape end from the cartridge, thereby allowing the machine to pull the tape end inside of the machine and secure the tape end to a spindle within the machine). For purposes of this discussion, the machine mechanism which "picks" the tape end from the cartridge will hereinafter be called the "picker".

In one cartridge design, the tape end to be drawn inside the machine is secured to an element called a leader block. One example of this cartridge design is a cartridge made by IBM and designated model number 3480. When this cartridge is not being used, the leader block forms part of the cartridge wall itself (e.g., part of a perimeter wall or a corner of the cartridge). When installed within the machine which will read from or write to the cartridge tape, the machine inserts a picker into a hole within the leader block. The picker then pulls the leader block into the machine from its position on the cartridge. The tape is secured to the leader block by being wrapped about a pin which is snap fitted into a groove within the leader block. The pin is usually made of an elastomeric material which is slightly larger than the groove into which it fits so that the tape is firmly secured between the pin and the groove when the pin is snapped into place within the groove. The leader block shape of this cartridge design is also important in that once the leader block is fully drawn into the machine, one edge of the leader block forms an exterior surface of the spindle within the machine. Therefore, this leader block edge is curved to match the round exterior shape of the spindle.

A significant disadvantage of the leader block design is its size and shape. For a machine to read from or write to tape stored within a cartridge using a leader block tape connection, the machine must have a picker which is compatible with the rather unusual design, size, and shape of the leader block. Specifically, the picker must fit within the hole in the leader block, while the internal mechanism of the machine must be adapted to accept and secure the leader block (and its particular shape) within the machine. For the above-described leader block design, this means that the machine spindle must be designed to integrally house the leader block. These constraints dictate a relatively large leader block size and require fairly specific machine and spindle design parameters to allow the leader block to be manipulated, moved, and secured inside the machine. A relatively large leader block results in either a larger cartridge, a larger machine to read from and/or write to the tape, or both.

In another cartridge design, a tape splice is used rather than a leader block. Such a cartridge design is employed by Digital Linear Tape cartridges manufactured by Quantum Corporation. In this design, a piece of stiff and resilient connector tape (e.g., mylar) is secured to the end of the tape within the cartridge. The opposite end of the connector tape is formed to releasably attach to the machine picker, which is also a stiff and resilient piece of connector tape. The piece of connector tape secured to the tape within the cartridge may have a large hole in its free end which is "grabbed" and pulled by a hook in the picker. The tape splice cartridge design addresses the problem inherent in the leader block tape connection design: the relatively large sized and unusually-shaped connection between the tape and the picker. In the connector tape cartridge design, the spliced mylar-to-tape connection may be wound around the machine spindle, with the tape being wound on the machine spindle over the mylar-to-tape connection.

However, the tape splice cartridge design has its own design deficiencies. For example, reliability problems exist in the design of the stiff and resilient connection tape used to connect the picker to the cartridge tape. The connection tape must be stiff enough to resist bending during the connecting procedure (when the machine connects the connection tape to the cartridge tape), but must be flexible enough to easily bend while being wound around a spindle. Therefore, a compromise must be made to either stiffen the connection tape (thereby making winding more difficult and increasing the chance of incorrectly-wound tape) to facilitate easier "picking" or relax the connection tape (thereby making the picking procedure more difficult or unreliable). This compromise can result in a connection or winding which is undesirable. For example, incorrectly-wound tape may lead to tape damage and/or misfeeding of the tape in the cartridge or machine. Also, when a desired connection is not made and the machine attempts to wind the magnetic tape into the machine, the machine can "swallow" the picker (the disconnected connection tape). When the picker is thus "swallowed" into the machine, the machine usually must be serviced to extract the picker from the machine. Conversely, when a desired disconnection procedure fails, attempts to release the cartridge from the machine can cause damage to the tape, the cartridge, and/or the machine. In short, the compromise necessary to provide a connection tape which is both stiff enough to facilitate reliable connections and disconnections while being relaxed enough to be properly wound results in a less-than-optimal design.

The tape splice cartridge design has other undesirable features. For example, when the tape is wound around a spindle, the mylar-to-tape connection may cause the wound tape above the mylar-to-tape connection to be thicker than the other areas along the circumference of the wound tape (creating a "bump" in the wound tape). This bump caused by the mylar-to-tape connection is amplified as more tape is wound on the spindle, and has the undesirable effect of creating a "once around" type of runout on the spindle which can distort a recorded signal on the tape. Another disadvantage of the tape splice cartridge design is the fact that during winding operations, the mylar-to-splice connection passes over the recording head(s) of the machine. This action exposes the recording heads to potential damage and/or excessive wear.

As described above, although designs exist for connecting the tape of a cartridge to the picker of a machine which reads from and/or writes to the tape, each design suffers from significant drawbacks, including inefficient connection size, connection elements which create difficulty in establishing compatibility between cartridges and machines, and connection elements which are not optimally designed for both winding and connecting operations.

One solution to these problems is disclosed in U.S. Pat. No. 6,003,802. As shown in FIG. 1, a portion of a conventional data tape cartridge 38 with this solution is shown. The cartridge 38 has a movable door 39 that is shown in an open position. However, door 39 is typically biased to a closed position (not shown) to protect its data tape 30 when cartridge 38 is not in use. Cartridge 38 has a leader pin assembly 10, comprising a plurality of elements, that seats in a pair of grooves 40. Grooves 40 extend from an interior position inside of cartridge 38 to the exterior of cartridge 38. A single reel of tape 30 is stored in cartridge 38 and secured to leader pin assembly 10 in a manner as described in the above-referenced patent. Leader pin assembly 10 is shown in a secured position at the interior end of grooves 40 within cartridge 38. Each end 24 of leader pin assembly 10 fits into a respective groove 40. When a picker of a machine (not shown) extracts leader pin assembly 10 from cartridge 38, leader pin assembly 10 is pulled along grooves 40 (with ends 24 following in their respective grooves 40) out of cartridge 38 and into the machine. When tape 30 is wound back into cartridge 38, ends 24 of leader pin assembly 10 enter cartridge 38 via grooves 40 which guide leader pin assembly 10 back into the fully retracted position. The mouth 42 of each groove 40 may be beveled to permit easier entry of leader pin assembly ends 24 into grooves 40.

When leader pin assembly 10 is in the fully retracted position within cartridge 38, it is desirable to secure leader pin assembly 10 against unintentional movement during cartridge handling, storage, etc. Therefore, spring 44 secured within cartridge 38 has an arm 46 which is biased against leader pin assembly 10. Arm 46 of spring 44 is angled to permit entry and exit of leader pin assembly 10 to and from its fully contracted position only when the force exerted to extract or insert pin assembly 10 reaches a predetermined level. Such a force is exerted, for example, by rewinding tape 30 into cartridge 38 or by a picker (not shown) pulling leader pin assembly 10 from its fully contracted position.

After an extended amount of use, the leader pin assembly 10 may detach from tape 30, or tape 30 may break such that the leader pin assembly 10 is lost, thereby rendering cartridge 38 unusable. Since there are currently no solutions for reattaching leader pin assemblies to data tape, the cartridge is simply discarded or destroyed. Although individual ones of the cartridges are relatively inexpensive, simply discarding a cartridge because it no longer has a leader pin can become expensive over time. Thus, a need exists to reattach leader pins to the data tape of cartridges in an easy and cost-effective manner.

SUMMARY OF THE INVENTION

One embodiment of a system, method, and apparatus for reattaching a leader pin assembly to the data tape of a data tape cartridge utilizes a tool that snaps onto the cartridge body. The tool secures the door of the cartridge in an open position with a small lug on an underside of the tool. The loose leader tape inside the cartridge is pulled from the cartridge and laid in an alignment channel that extends past a set of notches or receptacles that are provided for retaining a leader pin. A leader pin is inserted into the notches over the tape, and a clip is inserted into a pocket within a movable arm on the tool. An open side of the clip faces toward the leader pin. The tape is then folded over and pulled down over the leader pin and held in the alignment channel with a finger of the user. The arm of the tool, which retains the clip, is then pivoted from a disengaged position to an engaged position. The clip snaps over a center section of the leader pin and folded tape to form a leader pin assembly, thereby securing the tape in the leader pin assembly. Any excess tape extending beyond the clip may be trimmed off with a pair of scissors or other appropriate means. The tape is then wound back into the cartridge with the new leader pin guided by the tool into a seated position located within the cartridge.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
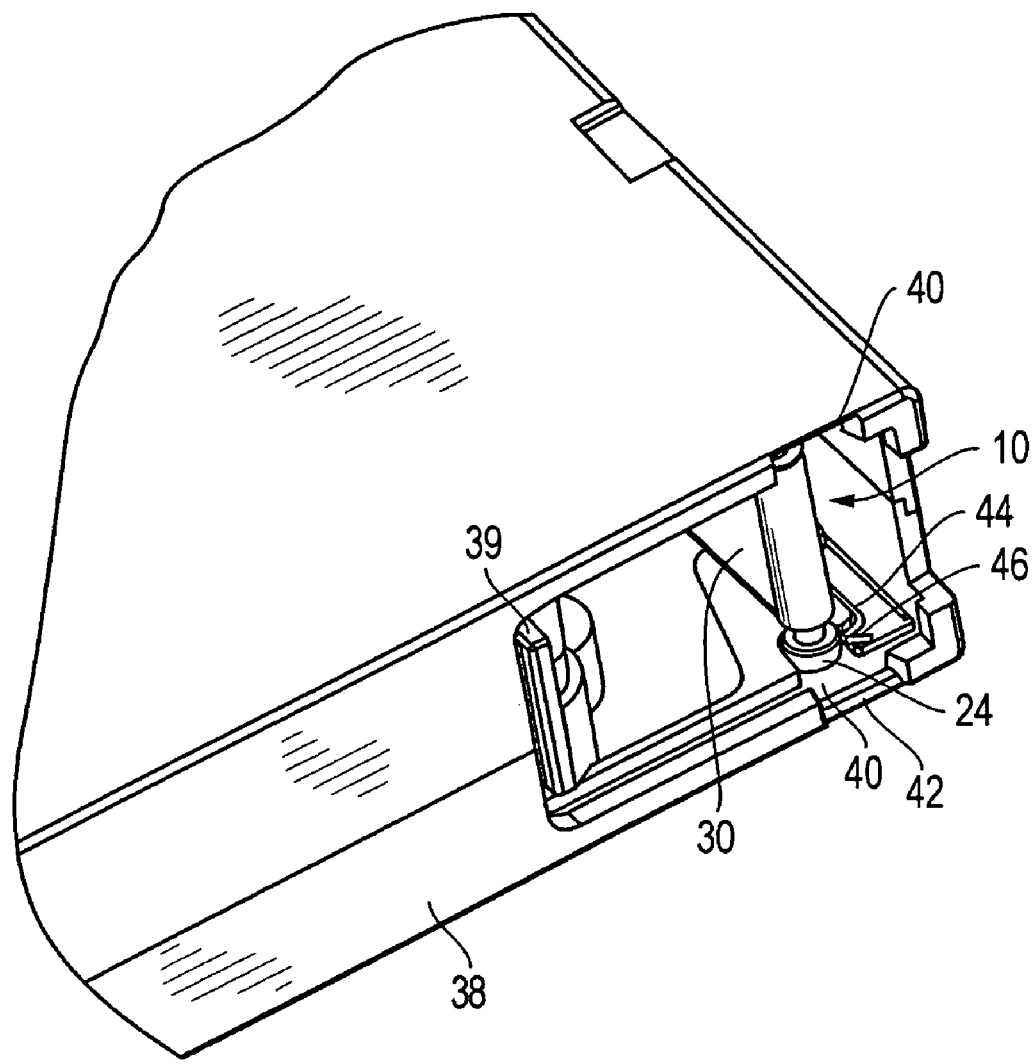
FIG. 1 is an isometric view of a portion of a conventional data tape cartridge.

Referring to FIGS. 2–8, one embodiment of a system, method, and apparatus for attaching a leader pin to the data tape 130 of a data tape cartridge 138 with a tool 150 is disclosed. The leader pin may comprise, for example, a leader pin assembly having a leader pin 112 (FIGS. 7 and 8) and a retention clip 114 as is known in the art and generally described above with respect to FIG. 1. The data tape cartridge 138 (FIGS. 5 and 6) may comprise a conventional, generally rectangular design having edges 140 that are substantially planar. A spool 142 of the data tape 130 is located inside the data tape cartridge 138 and has a leader end 144. The cartridge 138 also has a movable door 146 for accessing the data tape 130 and is movable between an open position and a closed position. The door 146 is typically spring-biased to the closed position to better protect data tape 130 when cartridge 138 is not in use.

Figure 2:
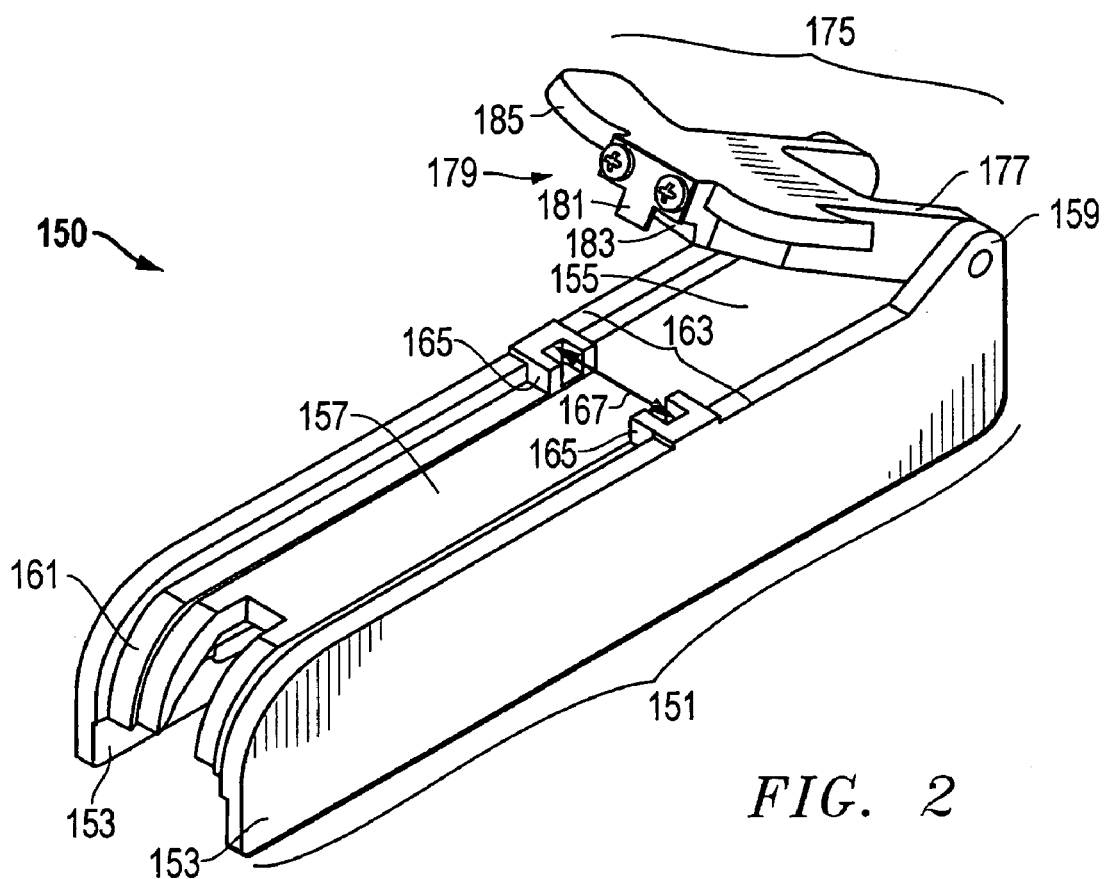
FIG. 2 is an upper isometric view of one embodiment of a tool constructed in accordance with the present invention and is shown with a termination mechanism of the tool in a disengaged position.
Figure 3:
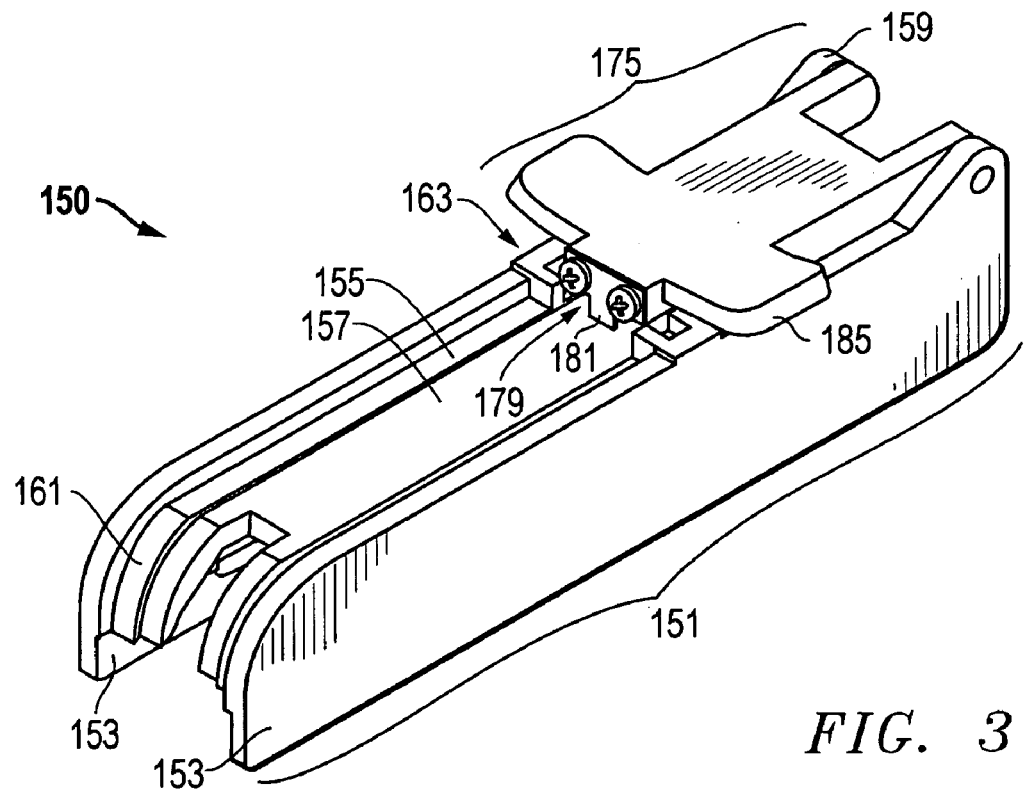
FIG. 3 is an upper isometric view of the tool of FIG. 2 with the termination mechanism in an engaged position.
Figure 4:
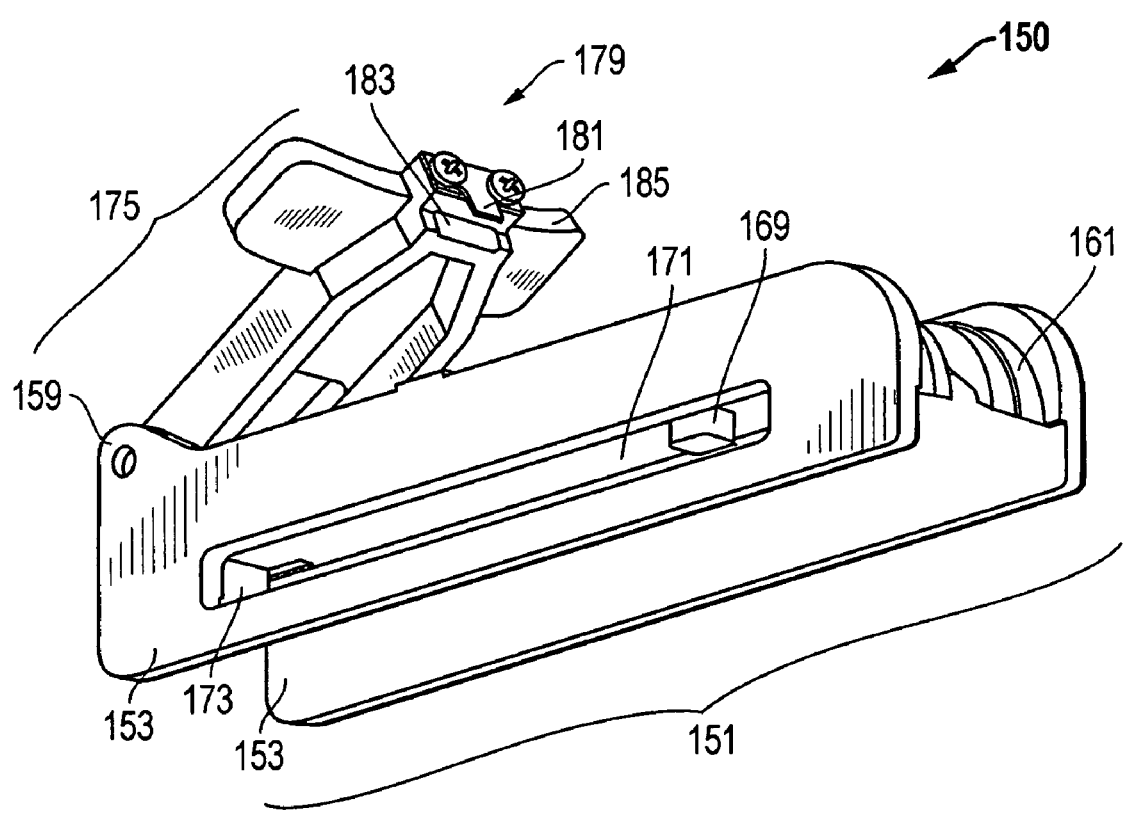
FIG. 4 is a lower reverse isometric view of the tool of FIG. 2 with the termination mechanism in the disengaged position.

A system constructed in accordance with one embodiment of the present invention utilizes the tool 150 to attach the leader pin (e.g., leader pin 112 and retention clip 114) to the data tape 130 of the data tape cartridge 138. As shown in FIGS. 2–4, the tool 150 has a base 151 with a pair of parallel side walls 153, and a platform 155 extending perpendicularly between the side walls 153. As shown in FIGS. 5–8, the platform 155 and side walls 153 closely receive and straddle one of the edges 140 of the data tape cartridge 138. An alignment channel 157 is formed on or in the platform 155 for receiving the leader end 144 (FIGS. 7 and 8) of the data tape 130 in a planar orientation thereon.

The tool 150 also has a pivot end 159, a tape receiving end 161 located opposite the pivot end 159, and a leader pin retention feature 163 for retaining and supporting the leader pin 112. The leader pin retention feature 163 is positioned on the platform 155 adjacent to the alignment channel 157 between the pivot end 159 and the tape receiving end 161. In the embodiment shown, the leader pin retention feature 163 comprises a pair of blocks or receptacles 165 formed in the side walls 153 and platform 155 of the base 151 that define a leader pin pocket 167 which extends across the alignment channel 157 for engaging and retaining the leader pin 112.

Figure 5:
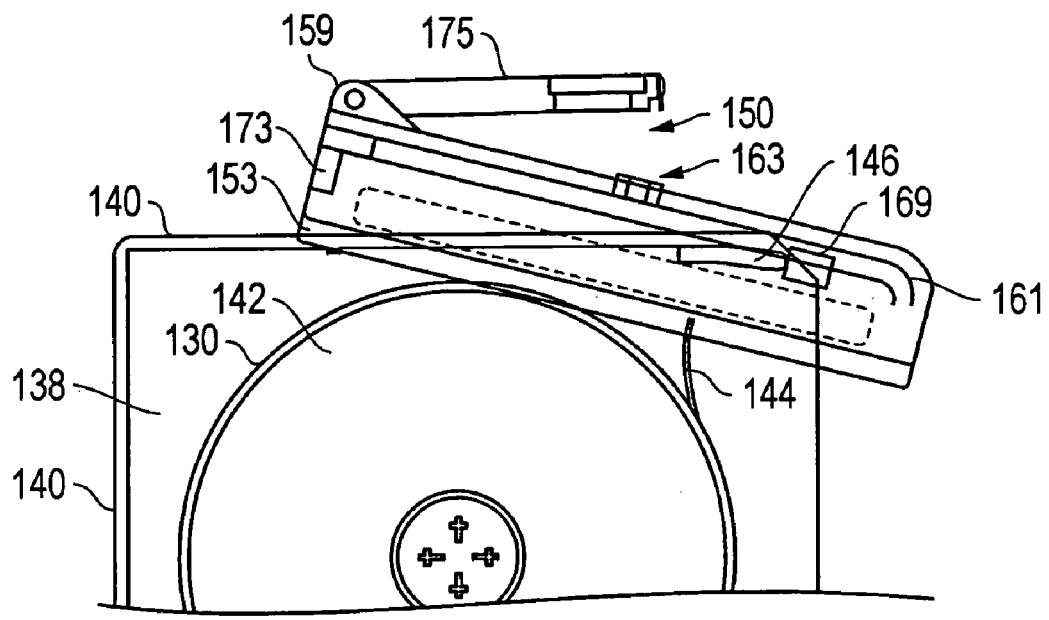
FIG. 5 is a sectional side view of the tool of FIG. 2 shown mounted to a data tape cartridge at an initial stage of use and a door of the data tape cartridge in a closed position.
Figure 6:
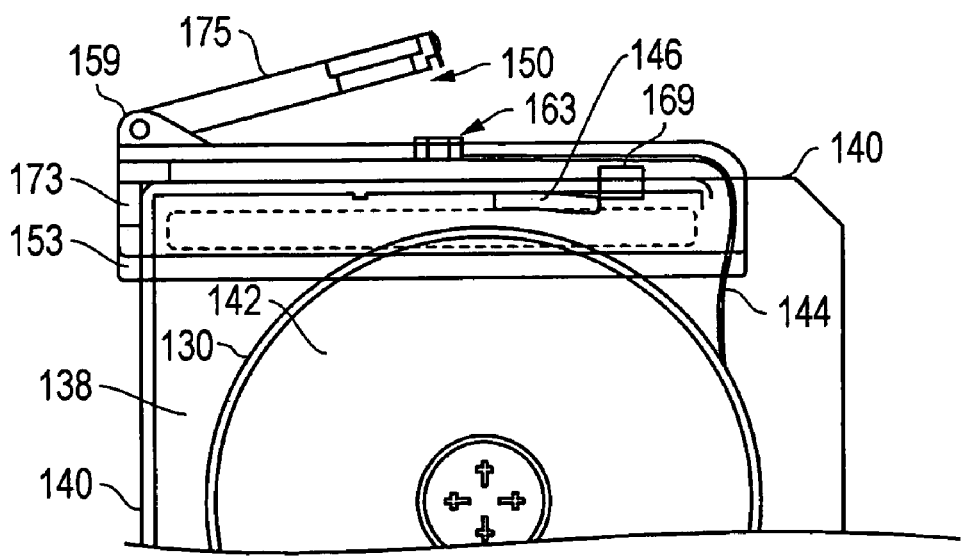
FIG. 6 is a sectional side view of the tool and data tape cartridge of FIG. 5 with the tool at an intermediate stage of use and the door of the data tape cartridge in an open position.

As shown in FIG. 4, the tool 150 is also provided with a door lug 169 for engaging and moving the door 146 (FIGS. 6 and 5) between the open and closed positions, respectively. The door lug 169 is formed on the platform 155 on a surface 171 opposite the alignment channel 157. As best shown in FIGS. 4–6, a capture lug 173 is formed on base 151 of tool 150 for engaging another one of the edges 140 (FIG. 6) of the data tape cartridge 138. Capture lug 173 retains the tool 150 on the data tape cartridge 138 when the door lug 169 engages and holds the door 146 in the open position. The capture lug 173 is formed on the base 150 adjacent to the pivot end 159 on surface 171 opposite the alignment channel 157.

Figure 7:
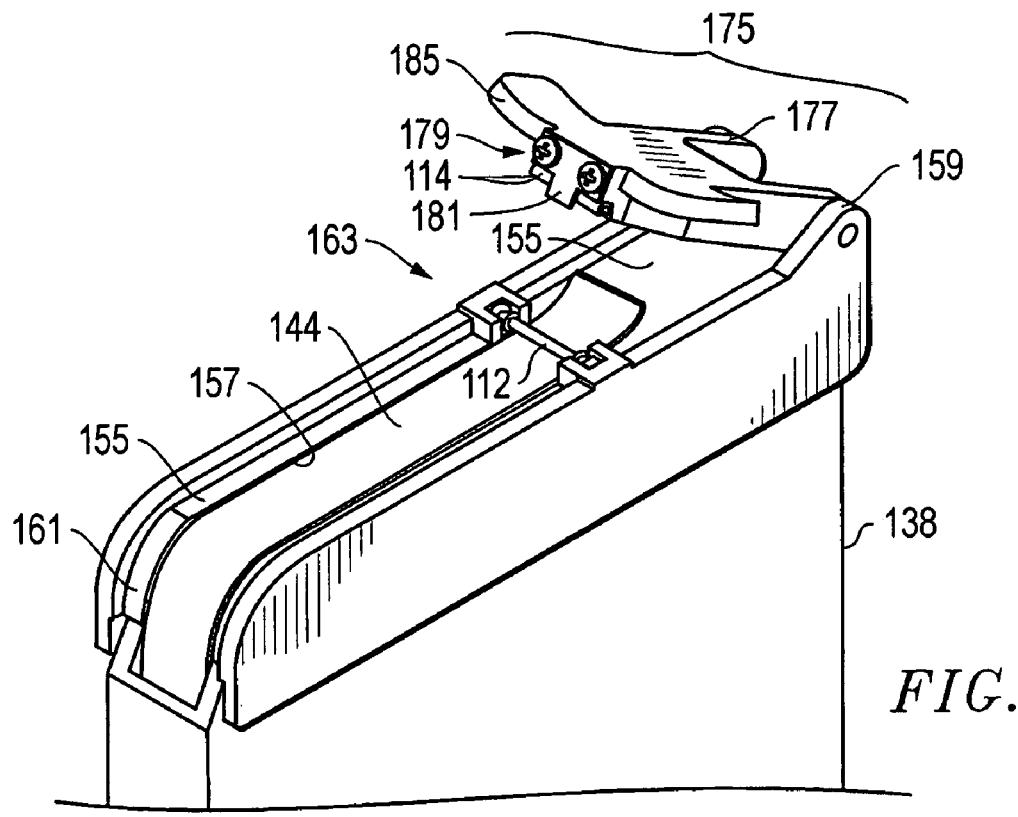
FIG. 7 is an isometric view of the tool and data tape cartridge of FIG. 5 with a leader end of a data tape of the data tape cartridge shown located in the tool, elements of a leader pin assembly shown mounted in the tool, and with the termination mechanism in the disengaged position.
Figure 8:
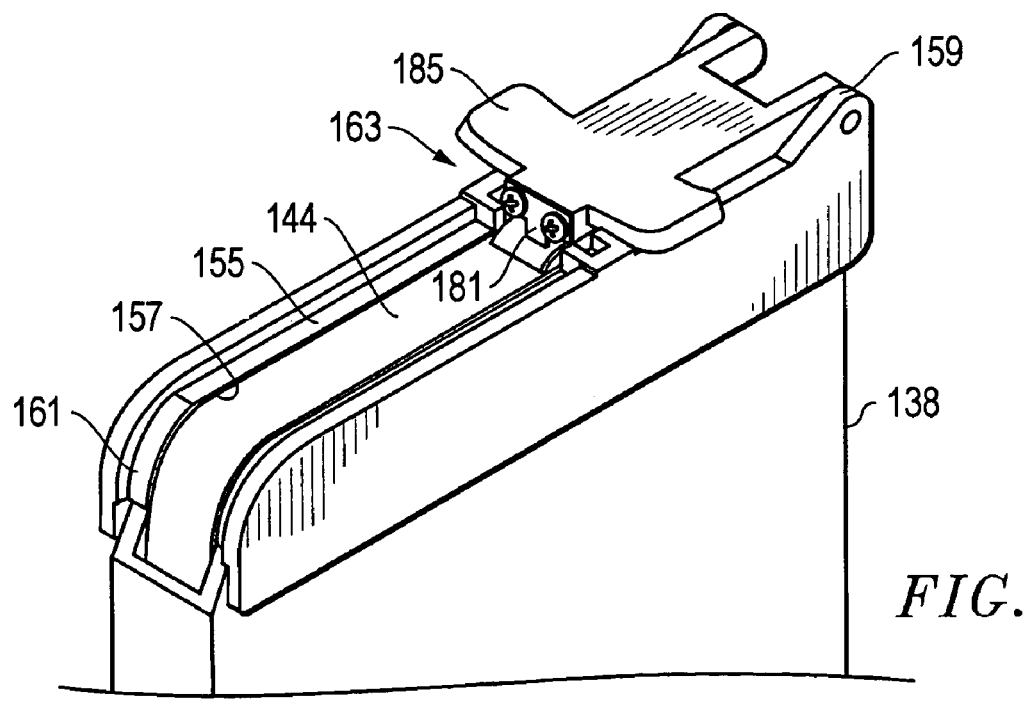
FIG. 8 is an isometric view of the tool, data tape cartridge, and leader pin assembly of FIG. 7 shown with the termination mechanism in the engaged position terminating the elements of the leader pin assembly to the leader end of the data tape.

Referring again to FIGS. 2–4, the tool 150 further comprises a terminating mechanism or arm 175 having a pivot end 177 pivotally mounted to and extending from the pivot end 159 of the base 150. In one embodiment, the arm 175 is spring-biased away from the base 150 to the disengaged position at an acute angle of approximately 30 degrees. The arm 175 is provided with a clip retention feature 179 for retaining and supporting the retention clip 114 (FIGS. 7 and 8). The clip retention feature 179 is located on the arm 175 opposite the pivot end 177 of the arm 175. The clip retention feature 179 comprises a tab 181 mounted to and spaced apart from a distal end 183 of the arm 175 to define a pocket for capturing and retaining the retention clip 114 therein.

The arm 175 also has a handle 185 in the form of a pair of flat, wing-like projections that are adjacent to the clip retention feature 179 for engagement by a user to pivot the arm 175 relative to the base 150. The arm 175 has a disengaged position (FIGS. 2 and 4–7) such that the clip retention feature 179 is located away from the base 150, and an engaged position (FIGS. 3 and 8) such that the clip retention feature 179 abuts the base 150 at the leader pin retention feature 163 to join and terminate the retention clip 114 and the leader pin 112 on the data tape 130.

In operation, the present invention also comprises a method of attaching or re-attaching the leader pin assembly to the data tape of a data tape cartridge. Although not necessarily in the order described, the method comprises placing the tool 150 on the data tape cartridge 138 (FIG. 5), and moving the tool 150 relative to the data tape cartridge 138 such that the tool 150 opens the door 146 on the data tape cartridge 138 (FIG. 6). The tool 150 closely receives and straddles an edge 140 of the data tape cartridge 138, and the tool 150 slides along the edge 140 (compare FIGS. 5 and 6) relative to the data tape cartridge 138 such that the door lug 169 on the tool 150 engages and moves the door 146 from the closed position (FIG. 5) to the open position (FIG. 6). The tool 150 is captured on the data tape cartridge 138 with a capture lug 173 when the door 146 in the open position since the door 146 on the data tape cartridge 138 is biased to the closed position.

The present invention has several advantages including the ability to quickly and easily attach a leader pin assembly to tape after the original leader pin assembly has become separated from the tape. This solution is much more cost effective than discarding or destroying cartridges simply because they lack a leader pin. Although individual ones of the cartridges are relative inexpensive, they add up over time. The solution presented herein offers a system, method, and apparatus for reattaching a leader pin assembly to the data tape of a data tape cartridge in the field without having to return the cartridge to the manufacturer. The tool secures the door of the cartridge in an open position so that the leader tape can be pulled from the cartridge by the user and laid in the tool. The user then loads the tool with the elements of the leader pin assembly and completes the termination by pivoting the arm of the tool. Any excess tape extending beyond the clip is trimmed with scissors, and the tape is wound back into the cartridge with the new leader pin.

While the invention has been shown or described in only some of its forms, it should be apparent to those skilled in the art that it is not so limited, but is susceptible to various changes without departing from the scope of the invention. For example, the sequence of steps described in the method claims of the present invention do not necessarily have to performed in the order in which they appear.

What is claimed is:

1. A system for attaching a leader pin assembly having a leader pin and a retention clip to a data tape of a data tape cartridge with a tool, the data tape cartridge having edges that are substantially planar, a spool of data tape located inside the data tape cartridge having a leader end, and a movable door for accessing the data tape, the door having an open position and being biased to a closed position, the system comprising:

a base having a pair of side walls, a platform extending between the side walls, the platform and side walls relatively positioned to closely receive and straddle one of the edges of the data tape cartridge, an alignment channel formed on the platform for receiving the leader end of the data tape in a planar orientation thereon, a pivot end, a tape receiving end located opposite the pivot end, a leader pin retention feature for retaining and supporting the leader pin, a door lug structurally positioned relative to the side walls to cause engaging and moving the door between the open and closed positions as the data tape cartridge is received and straddled, and a capture lug structurally positioned relative to the side walls to cause engaging another one of the edges of the data tape cartridge and retaining the tool on the data tape cartridge when the door lug engages and holds the door in the open position as the data tape cartridge is received and straddled by the side walls;

an arm having a pivot end pivotally mounted to and extending from the pivot end of the base, a clip retention feature for retaining and supporting the retention clip; and the arm having a disengaged position such that the clip retention feature is located away from the base, and an engaged position such that the clip retention feature abuts the base at the leader pin retention feature to join and terminate the retention clip and the leader pin on the data tape.

2. The system of claim 1, wherein the leader pin retention feature comprises a pair of receptacles in the base that define a leader pin pocket which extends across the alignment channel for engaging and retaining the leader pin.

3. The system of claim 1, wherein the clip retention feature comprises a tab mounted to and spaced apart from a distal end of the arm for capturing and retaining the retention clip therein.

4. The system of claim 1, wherein the arm is spring-biased away from the base to the disengaged position at an acute angle of approximately 30 degrees.

5. The system of claim 1, wherein the door lug is formed on the platform on a surface opposite the alignment channel.

6. The system of claim 1, wherein the capture lug is formed on the base adjacent to the pivot end opposite the alignment channel.

7. The system of claim 1, wherein the leader pin retention feature is positioned on the platform adjacent to the alignment channel between the pivot end and the tape receiving end.

8. The system of claim 1, wherein the clip retention feature is located on the arm opposite the pivot end of the arm.

9. The system of claim 1, further comprising a handle formed on the arm adjacent to the clip retention feature for engagement by a user to pivot the arm relative to the base.

10. A method of attaching a leader pin assembly to a data tape of a data tape cartridge, the data tape cartridge having a door for accessing the data tape, the method comprising:

(a) placing a tool on the data tape cartridge;
(b) moving the tool relative to the data tape cartridge such that the tool opens the door on the data tape cartridge;
(c) capturing the tool on the data tape cartridge with the door in an open position;
(d) retrieving a portion of the data tape not attached to a leader pin assembly from the data tape cartridge;
(e) placing the portion of the data tape in the tool;
(f) loading the leader pin assembly not attached to a data tape in the tool;
(g) terminating the leader pin assembly to the portion of the data tape such that it becomes attached to the data tape;
(h) removing the portion of the data tape and attached leader pin assembly from the tool; and
(i) removing the tool from the data tape cartridge.

11. The method of claim 10, wherein step (a) comprises closely receiving and straddling an edge of the data tape cartridge, and wherein step (b) comprises sliding the tool relative to the data tape cartridge such that a door lug on the tool engages and moves the door to the open position.

12. The method of claim 10, wherein the leader pin assembly comprises first and second elements, and step (d) comprises placing the first element on top of the portion of the data tape, folding the portion of the data tape over the first element, and wherein step (g) comprises moving the second element into engagement with the first element and the portion of the data tape.

13. The method of claim 12, wherein the door on the data tape cartridge is biased to a closed position, and wherein step (c) comprises capturing the tool on the data tape cartridge with a capture lug formed on the tool as the door is biased and engages the door lug of the tool.

14. The method of claim 10, wherein step (g) comprises moving an arm on the tool to crimp the leader pin assembly to the data tape.

* * * * *